United States Patent [19]

Bost et al.

[11] 4,216,138
[45] Aug. 5, 1980

[54] FLAME-RESISTANT POLYOLEFIN COMPOSITIONS

[75] Inventors: Howard W. Bost; Tommey A. Yokley, Jr., both of Bartlesville, Okla.

[73] Assignee: Phillips Petroleum Company, Bartlesville, Okla.

[21] Appl. No.: 713,778

[22] Filed: Aug. 12, 1976

[51] Int. Cl.$^2$ .............................................. C08K 5/52
[52] U.S. Cl. ........................ 260/45.75 B; 260/45.8 N; 260/45.8 AD
[58] Field of Search ................ 260/45.8 NT, 45.75 B, 260/45.9 AD

[56] References Cited

U.S. PATENT DOCUMENTS 3,936,416   2/1976   Brady ........................... 260/45.9 NP

OTHER PUBLICATIONS

Chemical Abstracts 68, 1968, citation 41213u.
Chemistry and Uses of Fire Retardants by Lyons, 1970, pp. 21 to 24, 290 to 297.

Primary Examiner—V. P. Hoke

[57] ABSTRACT

The fire-resistance properties of polyolefin compositions containing certain phosphorus-containing flame retardants are enhanced by incorporating in said compositions a suitable amount of antimony trioxide.

10 Claims, No Drawings

FLAME-RESISTANT POLYOLEFIN COMPOSITIONS

This invention relates to flame-resistant polyolefin compositions.

Various additives have been proposed for imparting flame resistance to polyolefins. U.S. Patent application Ser. No. 641,042, filed Dec. 15, 1975, by Donnie G. Brady, now U.S. Pat. No. 4,010,137 discloses the employment of a particular type of phosphorus-containing additive in preparing a flame-resistant polyolefin composition. While additives of that type are quite capable of imparting various degrees of flame resistance to polyolefins in order to get certain levels of flame resistancy it is sometimes necessary to employ loadings of the phosphorus-containing additive which affect other physical properties of the polyolefin composition in such a manner that the resulting polyolefin compositions are not satisfactory for certain applications. For example, high loadings of the phosphorus-containing flame retardant can so affect the tensile strength and brittleness of the polyolefin composition that it would not be satisfactory for certain applications. Accordingly, it is desirable to enhance the effectiveness of such phosphorus-containing flame retardants so that the loading of the additives in the polyolefin composition can be lowered without also lowering the flame resistance of the polyolefin composition.

Therefore, an object of this invention is to provide a composition in which an additive is employed to lower the amount of phosphorus-containing retardant that is necessary to provide a given level of flame resistance to a polyolefin composition.

Another object of this invention is to provide a flame resistant polyolefin composition.

Other aspects, objects, and advantages of the present invention will be obvious to those skilled in the art having the benefit of the present disclosure.

According to the present invention a flame-resistant polyolefin composition is provided comprising (1) normally solid polyolefin; (2) a certain type of phosphorus-containing flame retardant; and (3) antimony trioxide in an amount which will enhance the flame resistance provided by the phosphorus-containing flame retardant.

Examples of normally solid polyolefins that can be rendered flame resistant in accordance with this invention include polymers of mono-alpha olefins having the general formula $CH_2=CHR$ wherein R represents hydrogen or a hydrocarbyl radical having up to 10 carbon atoms and selected from the group consisting of aryl, alkyl, cycloalkyl, and combinations thereof such as alkaryl, and aralkyl. Typical polymers are the homopolymers of ethylene, propylene, butene-1, isobutylene, pentene-1, styrene, and dimethylstyrene and the copolymers or terpolymers of two or more of such alpha-olefins. Such polymers can be prepared by any suitable process which produces a normally solid polyolefin. A presently favored copolymer is a propylene-ethylene copolymer in which the ethylene moiety is present in amounts ranging from about 2 to about 25 weight percent of the copolymer, or preferably from about 5 to about 15 weight percent of the copolymer. The preparation of such a propylene-ethylene copolymer is described in J. S. Gwinn, U.S. Pat. No. 3,689,595, issued Sept. 5, 1972.

The phosphorus-containing flame retardant employed in this invention is the product which results when suitable amounts of (1) at least one phosphorus oxide compound of the formula $(P_2O_5)_{0.5-1.0}(H_2O)_{0.0-1.5}$, (2) melamine, and (3) at least one saturated open-chain polyol containing from 5 to 15 carbon atoms and from 4 to 8 hydroxyl groups are combined and heated prior to incorporation into a polyolefin composition under such conditions that the product will not cause significant foaming of the polyolefin composition when the polyolefin composition is subsequently subjected to molding conditions.

In general the heating required to produce the phosphorus-containing flame retardant as described will be conducted at a temperature in the range of about 100° to about 300° C. for about 1 to about 25 hours.

Generally, it is considered that flame resistance will be provided if 1 to 100 parts by weight of each of the three above-named ingredients is employed in preparing the phosphorus-containing flame retardant where all parts by weight are on the same weight basis. Examples of such phosphorus-containing flame retardants include the following: (1) the reaction product of melamine pyrophosphate and dipentaerythritol; (2) the reaction product of phosphoric acid, urea, melamine, and at least one of pentaerythritol, dipentaerythritol, and tripentaerythritol; (3) the reaction product of phosphoric acid, phosphorus pentoxide, melamine, and at least one of pentaerythritol, dipentaerythritol, and tripentaerythritol; and (4) the reaction product of a condensed phosphoric acid, melamine, and at least one of pentaerythritol, dipentaerythritol, and tripentaerythritol.

Phosphorus oxide compounds of the formula $(P_2O_5)_{0.5-1.0}(H_2O)_{0.0-1.5}$ include, for example, phosphorus pentoxide, orthophosphoric acid, and condensed phosphoric acids. A condensed phosphoric acid is a phosphoric acid containing any quantity of one or mor polyphosphoric acids and/or metaphosphoric acids. Any such acid can be employed in this invention. The polyphosphoric acids include the dimeric pyrophosphoric acid and other entities such as the trimer through the nonamer and even more highly condensed species. The properties of and compositions of the condensed phosphoric acids vary with the $P_2O_5$ content of the condensed phosphoric acid as discussed in Bell, "Composition of Strong Phosphoric Acids", Industrial and Engineering Chemistry, 40, 1464–1467 (1948). Although any condensed phosphoric acid is suitable for the present invention, generally a condensed phosphoric acid having from about 70 to about 100 weight percent $P_2O_5$ can be employed; or, more preferably, the condensed phosphoric acid employed contains about 80 to about 90 weight percent $P_2O_5$. Such condensed phosphoric acids may be prepared by any technique known by those skilled in this area.

The saturated open-chain polyols employed in preparing the phosphorus-containing flame retardant contain from 5 to 15 carbon atoms and from 4 to 8 hydroxyl groups per molecule. Preferably, in addition to C, H, and hydroxyl groups the only other functional groups in the polyols are a maximum of two ether linkages per molecule. Examples of suitable polyols include, sorbitol, manitol, pentaerythritol, dipentaerythritol, and tripentaerythritol.

Also in preparing the phosphorus-containing flame retardant, minor amounts of other materials can be added to improve its color, physical handling properties, and the like.

As indicated above, one example of a phosphorus-containing flame retardant is the reaction product of melamine pyrophosphate and at least one polyol selected from pentaerythritol, dipentaerythritol, and tripentaerythritol. The melamine pyrophosphate and polyol are combined in proportions that will impart flame resistance to a synthetic resin. In general, the weight ratio of melamine pyrophosphate to polyol will be in the range of about 14:1 to about 0.2:1, or more preferably from about 4:1 to about 1:1. Generally the polyol and melamine pyrophosphate are heated at a temperature in the range of about 175° C. to about 275° C. until the foaming has substantially subsided.

Another phosphorus-containing flame retardant mentioned above is the reaction product of orthophosphoric acid, urea, melamine, and at least one polyol selected from pentaerythritol, dipentaerythritol, and tripentaerythritol. Although the reactants can be employed in any proportions that will impart flame resistance, generally there is employed from about 30 to about 100 parts by weight of orthophosphoric acid, about 40 to about 125 parts by weight of urea, about 3 to about 90 parts by weight of melamine, and about 5 to about 90 parts by weight of polyol, where all parts by weight are on the same weight basis. Within this general range the preferred amounts of reactants to be employed are about 60 to about 80 parts by weight orthophosphoric acid, about 75 to about 95 parts by weight urea, about 5 to about 70 parts by weight melamine, and about 10 to about 40 parts by weight polyol.

The reactants, viz., orthophosphoric acid, urea, polyol, and melamine can be simultaneously reacted. Alternatively, the orthophosphoric acid and the urea can be combined and then polyol added to provide a mixture which is heated until substantially all the esterification of the phosphoric acid has taken place, to yield a solid esterification product. This esterification product is combined with the melamine and then the resulting mixture is subjected to heating which will insure that the flame retardant when incorporated into a synthetic resin will not cause significant foaming when the synthetic resin is subjected to molding conditions, but will impart flame resistance to said synthetic resin. Another alternative involves combining the phosphoric acid and polyol, then adding the urea and heating the mixture until substantially all the esterification has taken place to yield a solid esterification product, then the melamine is combined with the esterification product and the admixture is subjected to degassing, as in the previously described method. Generally, when this method or the immediately preceding described method is employed for preparing the inventive flame retardant, the weight ratio of the esterification product to melamine is in the range of about 10:1 to about 1:2 or, preferably, in the range of about 6:1 to about 1:2.

In preparing the flame retardant from urea, phosphoric acid, polyol, and melamine the temperatures found satisfactory for degassing the retardant are generally in the range of about 190° to about 280° C. The time required for degassing is generally in the range of from about 0.5 to about 4 hours. The esterification generally requires heating for several hours at a temperature of at least about 100° C.

The phosphorus-containing flame retardant employed in this invention can also be prepared by combining polyphosphoric acid (or a mixture of phosphorus pentoxide and orthophorphoric acid) with polyol mixed with a small amount of melamine, stirring for about 2-3 hours while the temperature is increased to about 120° C. (248° F.), adding more melamine and heating at a temperature in the range of 180°-250° C. (356°-482° F.) for at least 2 hours after all the melamine has been added.

When orthophosphoric acid and phosphoric pentoxide, rather than polyphosphoric acid, are employed it is preferred that the orthophosphoric acid, phosphorus pentoxide, melamine, and polyol be used in amounts such that the respective molar ratio of the ingredients is in the range of 0.5-1.5:2-3:2-3:0.5-2.5.

Regardless of the method chosen for preparation, generally after the phosphorus-containing flame retardant is prepared, it is allowed to cool to form a solid and then is pulverized to a form that is easily compounded into a polyolefin resin.

In the present invention the phosphorus-containing flame retardant is added to the polyolefin in an amount that alone would be insufficient to provide a flame resistance rating of V-O according to a modified U.L.-94 flame test that will be now described. Underwriters Laboratory has developed a vertical burning test which is set forth in Underwriters Laboratory Bulletin 94 and is for this reason denoted as the U.L. 94 vertical burning test. A complete discussion of the U.L.-94 test procedure is provided in the article beginning on page 92 of the October 1970 issue of Modern Plastics. In developing the present invention a Modified U.L.-94 test was employed. The Modified U.L.-94 test involved the use of $5'' \times \frac{1}{2}'' \times \frac{1}{8}''$ test specimens. The test specimens were held vertically and ignited on their lower end with a standard flame for 10 seconds. The flame was then removed and the length of time for continued burning was measured. If the burning subsided within 30 seconds after flame removal, the flame was immediately applied again for 10 seconds. The flame was then removed and the length of time of continued burning measured again. Then the flame was applied to the sample one final time for 10 seconds. The average burning time of the three burns was noted. If the average burning was greater than 25 seconds it was classified as "fail". If the average burning time was less than 25 seconds but flaming particles or drops were released the composition was classed as V-II. If the average burning time was less than 25 seconds and no flaming particles or drops released the composition was classed as V-I. If the average burning time was 5 seconds or less and no flaming particles or drops were released during this time the composition was classified as V-O. Since a V-O flame resistance rating according to the Modified U.L. 94 test disclosed herein is satisfactory for most applications and since an object of this invention is to reduce the loading of flame retardants in the polyolefin, the compositions of this invention are limited to those which contain an amount of said phosphorus-containing flame retardant that alone is insufficient to provide the composition with a V-O flame rating according to the Modified U.L.-94 test disclosed herein. Generally the amount of phosphorus-containing flame retardant which is insufficient to provide such a flame rating will be in the range of from about 15 php to about 65 php, or more preferably in the range of from about 25 php to about 40 php. (The term "php" will be used in this disclosure to indicate parts by weight of an ingredient per hundred parts by weight of polyolefins.)

The compositions of the present invention contain an amount of antimony trioxide that is sufficient to enhance the flame resistance provided by the phosphorus-containing flame retardant. Generally an enhancing amount of the antimony trioxide will be in the range of from about 0.25 php to about 5 php, or more preferably in the range of from about 0.5 php to about 2.5 php.

The polyolefin compositions of the present invention can also include additives generally employed in polyolefin conmpositions such as, pigments and antioxidants. Of course, the amounts and types of other additives employed will depend upon the properties desired in the resulting polyolefin compositions.

One advantageous embodiment of the present invention includes a suitable amount of a hydrohalide salt of a monoamine or diamine in which the amine group is attached to a hydrocarbyl radical which is aromatic and/or aliphatic wherein the number of carbon atoms in said hydrocarbyl radical is in the range of from about 2 to about 24. Such hydrohalide salts have been noted to also enhance the flame retardancy effect of the phosphorus-containing flame retardant employed in this invention. Particularly preferred hydrohalide salts are alkylene diamine dihydrochlorides and alkylene diamine dihydrobromides, for example, ethylene diamine dihydrobromide and ethylene diamine dihydrochloride. When employed, the amount of said hydrohalide salt utilized is such that the combination of said hydrohalide salt and said phosphorus-containing flame retardant would alone be insufficient to impart to the polyolefin employed a flame resistance rating of V-O according to the modified U.L.-94 test disclosed herein. Generally when the amount of phosphorus-containing flame retardant employed is in the range of about 15 to about 65 php and the amount of antimony trioxide is in the range of about 0.25 to about 5 php the amount of hydrohalide salt is in the range of about 1 to about 10 php. When the amounts of phosphorus-containing flame retardant and antimony oxide are in the preferred range of respectively about 25 to about 40 php and about 0.5 to about 2.5 php, the amount of hydrohalide salt is preferably in the range of about 1.5 php to about 5 php.

In preparing the polyolefin compositions of the present invention, any suitable procedure can be used for incorporating the various additives into the polyolefin. Usually the polyolefin is heated to a temperature above its melting point and the various additives are dispersed therein, in any order, by milling or other suitable means until a uniform dispersion is obtained. Thereafter, the flame resistant polyolefin composition is extruded, granulated, or formed into articles of manufacture as desired.

The present invention will be further illustrated by the following examples. In the examples the term PCFR refers to the phosphorus-containing flame retardant.

EXAMPLE I

Preparation of PCFR's

A series of PCFR compositions were prepared employing phosphorus pentoxide, 85% orthophosphoric acid, pentaerythritol, and melamine. The proportions of the ingredients employed are set forth in the following table.

TABLE I

| | PCFR Preparations | | | | |
|---|---|---|---|---|---|
| PCFR No. | $P_2O_5$, g | 85% $H_3PO_4$, g | Pentaerythritol, g | Melamine, g | Other, g |
| 1 | 141 | 46.5 | 76.1 | 151.5 | Octadecanol, 45 |
| 2 | 47 | 15.5 | 27.2 | 50.5 | None |
| 3 | 94 | 31 | 54.4 | 101 | None |
| 4 | 94 | 31 | 54.4 | 101 | None |
| 5 | 141 | 46.5 | 81.6 | 151.5 | None |
| 6 | 141 | 46.5 | 81.6 | 151.5 | None |

TABLE I-continued

In general the preparations involved slowly adding the orthophosphoric acid to the phosphorus pentoxide. Thereafter a mixture of the pentaerythritol and about 10 weight percent of the melamine was added in small increments to the mixed acid with stirring. In preparing PCFR No. 1 octadecanol was included as a color improver. The octadecanol was added in admixture with the pentaerythritol. A nitrogen atomsphere was employed in the reactor at all times to exclude the presence of oxygen. Because of the viscosities developed it was necessary to take the temperatures outside the reaction vessel. Thus the temperatures reported herein only reflect an approximation of the temperature of the reaction.

In preparing PCFR No. 1 the mixture of pentaerythritol, melamine, and octadecanol was added to the mixed acid in portions with stirring during a time span of about 1 hour while the temperature was increased so that the temperature on the bottom of the reactor has about 115° C. Stirring was continued for about 2 more hours with the temperature on the bottom of the reactor being raised to about 140° C. The reactor was then shut down. On a subsequent day the resulting mixture was reheated with stirring to temperature of about 140° C. then the remaining melamine was added over the course of about ½ hour. After all the melamine was added stirring was continued for about 7 hours with the temperature of the reactor being in the range of about 220°–265° C. Thereafter the reactor was cooled and the PCFR recovered and pulverized for incorporation into polymer.

In preparing PCFR No. 2 the mixture of the pentaerythritol and the small amount of the melamine were added to the mixed acid continuously during a time span of about 5 hours while the temperature was increased to about 120° C. Then the remaining melamine was added over a time span of about 1 hour. After all the melamine was added the stirring was continued for about 3 hours with the temperature of the reactor being increased to about 200° C. in the first hour and to be in the range of about 200°–255° C. for the remaining two hours. The product was then recovered and pulverized.

In preparing PCFR No. 3 the mixture of pentaerythritol and some melamine was added to the mixed acid during about ½ while the temperature of the reactor was raised to about 100° C. Stirring was continued for about 3 more hours with the temperature being raised to about 150° C. Then the remaining melamine was added over a time span of about 5 hours. After all the melamine was added the stirring was continued for about 2 hours with the temperature being raised from about 160° to about 290° C. Thereafter the product was recovered and pulverized.

In preparing PCFR No. 4 the mixture of pentaerythritol and small amount of melamine was added slowly to the mixed acid. The mixture was heated to about 110° C. in the first ½ hour and was then allowed to cool 15 minutes down to a temperature of about 80° C. The temperature was then increased over the period of about 2½ hours to about 150° C. Then the remaining melamine was added over a time period of about 3 hours. After all the melamine was added the stirring was continued for about 2 hours with the temperature being raised from about 180° C. to about 290° C. The product was then recovered and pulverized.

In preparing PCFR No. 5 the mixture of pentaerythritol and part of the melamine was slowly added to the stirred mixed acid. Stirring was continued while the temperature was raised to about 120° C. in about 2 hours. Then the remaining melamine was added in about ½ hour while the temperature was maintained at about 120° C. Thereafter the stirring was continued for about 3 hours while the temperature was gradually raised to about 250° C. The product was then recovered and pulverized.

In preparing PCFR No. 6 the mixture of pentaerythritol and part of the melamine was slowly added to the stirred mixed acid. Stirring was continued while the temperature was raised to about 140° C. in about 3½ hours. Then the remaining melamine was added over a time period of about 1½ hours. After all the melamine was added stirring was continued while the temperature was raised from about 140° C. to about 235° C. during about 3½ hours. The product was recovered and pulverized.

EXAMPLE II

A series of polypropylene compositions were prepared and evaluated for flame retardancy. The polypropylene employed was Marlex ® 904 polypropylene fluff containing 0.09 weight percent Irganox 1010 (tetrakis[3-(3,5-di-tert-butyl-4-hydroxyphenyl)-propionyloxymethyl]methane), 0.25 weight percent distearylthiobispropionate, 0.07 weight percent butylated hydroxytoluene, 0.07 weight percent dioctyl phosphite, and 0.10 weight percent calcium stearate as antioxidants and processing aid. The PCFR when employed was PCFR No. 1 prepared as described in Example I. The compositions were prepared by blending the PCFR into the polymer on a steam heated roll mill. The preparation and evaluation of the compositions is summarized in Table II.

TABLE II

Effect of $Sb_2O_3$ on Polypropylene Containing PCFR No. 1

| Composition No. | PCFR php | $Sb_2O_3$ php | Milling Wt. Loss % | Modified UL-94 |
|---|---|---|---|---|
| 1 | 0 | 1.9 | 0.7 | Fail |
| 2 | 0 | 5.6 | 4.3 | Fail |
| 3 | 45 | 0 | 1.0 | V-O |
| 4 | 41 | 0 | 1.1 | V-O |
| 5 | 40 | 0 | 1.6 | V-O |
| 6 | 37.5 | 0 | 1.9 | Fail |
| 7 | 22.5 | 1.5 | 0.6 | Fail |
| 8 | 22.5 | 1.9 | 1.2 | Fail |
| 9 | 22.5 | 1.9 | 0.9 | Fail |
| 10 | 22.5 | 2.5 | 0.9 | Fail |
| 11 | 24 | 1.9 | 0.6 | V-O |
| 12 | 26.2 | 1.9 | 0.9 | V-O |
| 13 | 30 | 1.9 | 0.9 | V-O |

These data indicate that about 40 php of PCFR No. 1 was necessary to provide a polypropylene composition having a modified UL-94 rating of V-O. Compositions 1 and 2 indicate that small amounts of antimony oxide alone had no noticeable effect upon the flame resistance of the polypropylene. Compositions 11–13 demonstrate that when 1.9 php of antimony oxide is employed a V-O rating can be obtained with a much lower loading of PCFR No. 1. In fact the combined loading of the PCFR and antimony oxide required is less than the loading of the PCFR required for a V-O rating.

EXAMPLE III

Using the same polypropylene fluff as used in Example II compositions were made including ethylenediamine dihydrobromide (EDHBr). A comparison of the flame resistance of compositions containing EDHBr to those that do not is shown in Table III. In Table III the PCFR is PCFR No. 1.

TABLE III

Effect of $Sb_2O_3$ on Polypropylene Containing PCFR No. 1 and EDHBr

| Composition No. | PCFR php | $Sb_2O_3$ php | EDHBr php | Milling Wt. loss, % | Modified UL-94 |
|---|---|---|---|---|---|
| 14 | 22.5 | 0 | 5 | 0.6 | V-O |
| 9 | 22.5 | 1.9 | 0 | 0.9 | Fail |
| 15 | 22.5 | 1.0 | 1.9 | 0.6 | V-O |
| 16 | 22.5 | 1.9 | 1.9 | 1.5 | V-O |
| 17 | 22.5 | 1.9 | 1.9 | 2.1 | V-I |
| 10 | 22.5 | 2.5 | 0 | 0.9 | Fail |
| 18 | 22.5 | 1.25 | 2.5 | 0.9 | V-I |

Table III demonstrates that a combination of EDHBr and antimony trioxide is effective in improving flame resistance rating compared to that which can be obtained with a certain level of PCFR.

EXAMPLE VI

Using the same polypropylene fluff as used in Example II compositions were prepared employing PCFR's Nos. 2, 3, 4, 5, or 6. In some of the compositions ethylene dihydrobromide and/or antimony oxide was also employed. A summary of the preparation of the compositions and their flame resistance is shown in Table IV.

TABLE IV

| Composition No. | PCFR No. | PCFR php | $Sb_2O_3$ php | EDHBr php | Milling Wt. loss, % | Modified UL-94 |
|---|---|---|---|---|---|---|
| 19 | 2 | 60 | 0 | 0 | 2.6 | V-O |
| 20 | 2 | 52.5 | 0 | 0 | 1.7 | V-O |
| 21 | 2 | 37.5 | 0 | 0 | 1.3 | V-I |
| 22 | 2 | 30 | 0 | 0 | 1.4 | V-II |
| 23 | 2 | 22.5 | 0 | 0 | 0.6 | V-II |
| 24 | 2 | 22.5 | 1.9 | 0 | 1.8 | V-O |
| 25 | 6 | 22.5 | 1.9 | 0 | 0.3 | V-II |
| 26 | 5 | 25 | 2.5 | 0 | N.d.* | V-O |
| 27 | 3 | 25 | 2.5 | 0 | 0.6 | V-II |
| 28 | 3 | 25 | 5 | 0 | 0.3 | V-I |
| 29 | 4 | 22.5 | 1.9 | 1.9 | 0.6 | V-I |
| 30 | 4 | 22.5 | 0 | 1.9 | 0.6 | V-O |
| 31 | 5 | 18.7 | 2.5 | 5 | N.d. | V-O |
| 32 | 6 | 18.7 | 2.5 | 5 | N.d. | Fail |
| 33 | 6 | 15 | 2.5 | 5 | 3.1 | V-O |

*N.d. indicates not determined

The data in Table IV demonstrates that more than about 37.5 php of PCFR No. 2 was required to alone provide a rating of V-O. Composition 24 establishes that with a small amount of antimony trioxide only 22.5 php of PCFR No. 2 is needed to achieve a rating of V-O. The flame resistance rating of composition 25 suggests that PCFR No. 6 was not as an effective flame retardant as PFCR No. 2. Compositions 26–28 demonstrate that a small amount of antimony trioxide enhances the flame resistance that is obtained with PCFR's Nos. 5 and 3. Compositions 29 and 31 demonstrate that a combination of small amount of antimony trioxide and ethylene diamine dihydrobromide enhances the flame resistance that is obtained with either PCFR No. 4 to No. 5. The data obtained on Compositions 32 is inconclusive since Composition 33 having less PCFR had a greater flame resistance. Since the weight loss was not determined for Composition 32 it is not for certain whether the rating was due to an unusual weight loss or due to an inhomogenous mix in either Composition 32 or Composition 33.

EXAMPLE V

A series of ethylene-propylene copolymer compositions were prepared employing PCFR's No. 3, No. 4, or No. 5. The copolymer was employed as fluff containing 0.09 weight percent Irganox 1010, 0.25 weight percent distearylthiobispropionate, 0.07 weight percent dioctyl phosphite, 0.07 weight percent butylated hydroxytoluene and 0.10 weight percent calcium stearate as antioxidants and processing aid. The copolymer was produced in accordance with the teachings of the J. S. Gwinn patent mentioned above. The compositions were prepared by blending the PCFR, as well as antimony trioxide and/or ethylenediamine dihydrobromide if employed, with the copolymer on a steam heated roll mill. The preparation and evaluation of the compositions is summarized in Table V.

TABLE V

Effect of $Sb_2O_3$ and/or EDHBr on Ethylene-Propylene Copolymer Containing PCFR

| Composition No. | PCFR No. | $Sb_2O_3$ php | EDHBr php | Milling Wt. loss, % | Modified UL-94 |
|---|---|---|---|---|---|
| 34 | 4 | 40 | 0 | 0.0 | V-O |
| 35 | 4 | 30 | 0 | 0.9 | V-I |
| 36 | 4 | 26.2 | 0 | N.d. | Fail |
| 37 | 4 | 26.2 | 0 | 0.9 | V-II |
| 38 | 4 | 22.5 | 0 | 0.3 | Fail |
| 39 | 4 | 22.5 | 0 | N.d. | Fail |
| 40 | 4 | 22.5 | 0 | 3.1 | Fail |
| 41 | 4 | 22.5 | 0 | 0.6 | Fail |
| 42 | 4 | 22.5 | 1.9 | N.d. | Fail |
| 43 | 4 | 22.5 | 1.9 | N.d. | Fail |
| 44 | 4 | 22.5 | 1.9 | 3.0 | Fail |
| 45 | 4 | 25 | 1.9 | N.d. | Fail |
| 46 | 4 | 22.5 | 0 | 1.2 | V-II |
| 47 | 4 | 25 | 0 | N.d. | Fail |
| 48 | 4 | 22.5 | 0 | 0.6 | V-O |
| 49 | 4 | 22.5 | 2.5 | N.d. | V-O |
| 50 | 4 | 22.5 | 0.9 | 0.9 | V-O |
| 51 | 3 | 30 | 0 | 0.9 | V-O |
| 52 | 3 | 26.5 | 1.9 | 0.3 | V-I |
| 53 | 3 | 26.2 | 2.5 | 1.1 | V-O |
| 54 | 3 | 30 | 2.5 | 0.3 | V-O |
| 55 | 3 | 37.5 | 2.5 | 0.5 | V-O |
| 56 | 3 | 40 | 1.25 | 1.0 | V-O |
| 57 | 5 | 22.5 | 2.5 | 1.5 | V-O |
| 58 | 5 | 22.5 | 0.9 | 0.4 | V-O |
| 59 | 5 | 20 | 2.5 | 0.7 | V-O |

Note: EDHBr column values — rows 46-50 and 52-59: 46:5, 47:5, 48:5, 49:5, 50:1.9, 52:0, 53:5, 54:5, 55:5, 56:2.5, 57:5, 58:1.9, 59:5.

Table V demonstrates via compositions 34–41 that a V-O rating is not obtained unless more than about 30 php of PCFR No. 4 is employed. The difference in the flame resistance rating of compositions 46 and 48 is considered to be due to inhomogenous mixing or the difference in weight loss or both. Similar reasons are considered to explain the rating of composition 47 where a "fail" rating was obtained in spite of the fact that the composition had the same amount of hydrobromide salt and more PCFR No. 4 than did composition 48 which had a rating of V-O. Runs 49 and 50, however, do clearly establish that a combination of antimony trioxide and ethylenediamine dihydrobromide is effective in enhancing the flame resistance rating compared to that which can be obtained with a given loading of the PCFR. A similar showing is provided by composition 53. Other compositions giving a V-O rating are 57–59.

In regard to Examples IV and V it should be noted that due to variations in the methods of preparation, the various PCFR's are not all equally effective as flame retardants; therefore, comparisons should only be made between compositions containing the same PCFR.

The data on the foregoing specific compositions has been provided for the purpose of illustration only and is not intended to unduly limit the scope of the present invention as defined by the following claims. Since an object of this invention is to reduce the loading of flame retardants required it should be clear that it is preferred that the flame retardant additives in the inventive polyolefin compositions consist essentially of the defined phosphorus-containing flame retardant and antimony oxide or the defined phosphorus-containing flame retardant, antimony oxide, and a hydrohalide salt of a monoamine or diamine as described above.

What is claimed is:

1. A flame-resistant polyolefin composition consisting essentially of (1) normally solid polyolefin; (2) a phosphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said polyolefin composition under such conditions that said reaction product will not cause significant foaming of the polyolefin composition when said polyolefin composition is subjected to molding conditions; and (3) antimony trioxide; wherein said phosphorus-containing flame retardant is present in an amount that alone would be insufficient to impart to said polyolefin a flame resistance rating of V-O according to the Modified UL-94 test and wherein said antimony trioxide is present in an amount which enhances the flame resistance provided by the phosphorus-containing flame retardant.

2. A flame-resistant composition according to claim 1 wherein the phosphorus-containing flame retardant is prepared from about 1 to about 100 parts by weight of each of said phosphorus oxide compound, said melamine, and said polyol.

3. A flame-resistant composition according to claim 1 wherein the phosphorus-containing flame retardant is prepared from orthophosphoric acid, phosphorus pentoxide, melamine, and at least one polyol selected from the group consisting of pentaerythritol, dipentaerythritol, and tripentaerythritol.

4. A flame-resistant composition according to claim 3 wherein said orthophosphoric acid, said phosphorus pentoxide, said melamine, and said polyol are employed in amounts such that the respective molar ratio of the ingredients is in the range of 0.5–1.5:2–3:2–3:0.5–2.5.

5. A flame-resistant composition according to claim 1 wherein the amount of said phosphorus-containing flame retardant present is in the range of from about 15 php to about 65 php and the amount of said antimony trioxide present is in the range of from about 0.25 to about 5 php.

6. A flame-resistant composition according to claim 1 wherein the amount of said phosphorus-containing flame retardant present is in the range of from about 25 php to about 40 php and the amount of said antimony trioxide is in the range of from about 0.5 php to about 2.5 php.

7. A flame-resistant composition according to claim 5 wherein the phosphorus-containing flame retardant is prepared from orthophosphoric acid, phosphorus pentoxide, melamine, and at least one polyol selected from the group consisting of pentaerythritol, dipentaerythritol, and tripentaerythritol and wherein said orthophosphoric acid, said phosphorus pentoxide, said melamine, and said polyol are employed in amounts such that the respective molar ratio of said ingredients is in the range of 0.5–1.5:2–3:2–3:0.5–2.5.

8. A flame-resistant composition according to claim 7 wherein said solid polyolefin is a homopolymer or copolymer of mono-alpha-olefins having the general formula $CH_2=CHR$ wherein R represents hydrogen or a hydrocarbyl radical having up to 10 carbon atoms.

9. A flame-resistant composition according to claim 7 wherein said polyolefin is polypropylene.

10. A flame-resistant composition according to claim 7 wherein said polyolefin is an ethylene-propylene copolymer containing a major portion of propylene.

* * * * *